United States Patent
Ives

[15] 3,665,384
[45] May 23, 1972

[54] ROAD VEHICLE ELECTRICAL SYSTEM WITH TRANSDUCERS DETECTING FAULTS AND PRODUCING UNIQUE OUTPUTS OPERATING A RECEIVING AND DISPLAY UNIT

[72] Inventor: Andrew Peter Ives, Solihull, England
[73] Assignee: Joseph Lucas (Industries) Limited, Birmingham, England
[22] Filed: Aug. 25, 1970
[21] Appl. No.: 66,699

[30] Foreign Application Priority Data

Aug. 26, 1969   Great Britain.....................42,455/69

[52] U.S. Cl. ..........................340/52 F, 180/103, 307/10 R
[51] Int. Cl. ............................................................B60q 1/00
[58] Field of Search .................340/52 F, 52 R, 66, 414, 412, 340/420; 180/103; 307/10 R, 99, 130, 116; 315/136, 315, 133, 132, 77

[56] References Cited

UNITED STATES PATENTS 3,431,779   3/1969   Wilken et al.........................340/52 R

*Primary Examiner*—John W. Caldwell
*Assistant Examiner*—Glen R. Swann, III
*Attorney*—Holman & Stern

[57] ABSTRACT

A fault detecting system for a road vehicle includes a plurality of fault transducers, each producing its own unique output in the event of a fault. The receiving and display unit is operable by these unique outputs for indicating each fault, and a single cable is used to connect all the transducers to the receiving and display unit.

3 Claims, 4 Drawing Figures

ROAD VEHICLE ELECTRICAL SYSTEM WITH TRANSDUCERS DETECTING FAULTS AND PRODUCING UNIQUE OUTPUTS OPERATING A RECEIVING AND DISPLAY UNIT

BACKGROUND OF INVENTION

This invention relates to a fault detecting system for road vehicles.

Where warning devices are provided in a road vehicle for indicating various faults, the complexity of the vehicle wiring harness increases, and since different types and numbers of faults are indicated on different vehicles it becomes difficult to provide a single harness suitable for more than one vehicle. The object of the invention is to minimize this difficulty.

SUMMARY OF THE INVENTION

A system according to the invention comprises a plurality of fault transducers each producing its own unique output in the event of a fault, a receiving and display unit operable by said unique outputs for indicating each fault, and a single cable connecting all the transducers to the receiving and display unit.

The system specified above enables a single wiring harness to be used in vehicles having widely different fault detecting systems. For example, on a vehicle where only two faults are to be detected, then two transducers would be used, both transducers being coupled to the single cable and fed to a receiving and display unit having two stages for the two faults respectively. Using the same harness on a vehicle on which four faults are to be detected, then all that is necessary is to use a receiving and display unit with four stages, and to employ four transducers which are coupled to the receiving and display unit through the same single cable.

BRIEF DESCRIPTION OF THE DRAWINGS

In the accompanying drawings.

DESCRIPTION OF THE PREFERRED EMBODIMENT

Figure 1:
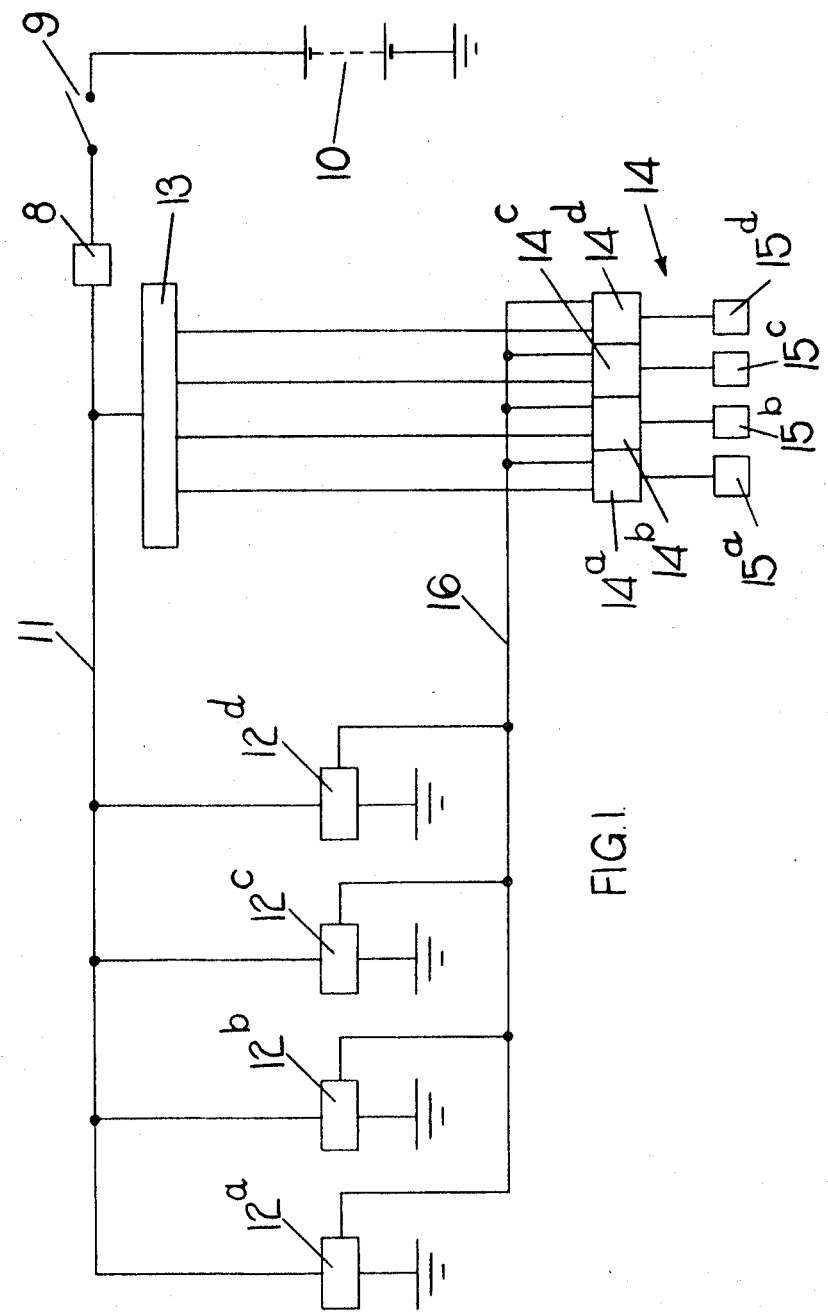
FIG. 1 is a block diagram illustrating one example of the invention.

Referring to FIG. 1, a road vehicle includes a battery 10 having one terminal earthed and a supply line 11 connected to the live battery terminal through the ignition switch 9 of the vehicle. The battery voltage is held substantially constant by a conventional regulator, but in addition the voltage on the line 11 is accurately controlled by a separate regulator shown at 8. It is desired to monitor four faults on the vehicle, and for this purpose four fault transducers 12a, 12b, 12c and 12d are provided at appropriate positions on the vehicle, the transducers being connected between the line 11 and earth. The form of the transducers is not important, as long as they provide an electrical output when the fault occurs, and as long as the output from each of the four transducers is different.

The line 11 is further connected to a reference generator 13, which supplies four signals to the four stages 14a, 14b, 14c, 14d, of a receiving and display unit 14 having lamps or other indicators 15a, to 15d, which are operated by the stages 14a to 14d respectively. The output terminals of the transducers 12a to 12d are connected to a single cable 16 which provides an input to each of the stages 14a to 14d. By virtue of the input signal received from the generator 13, each of the stages 14a to 14d responds to an output from the transducers 12a to 12d respectively, so that if a fault occurs resulting in an output from the transducers 12a, then the stage 14a operates to energize the indicator 15a. Likewise, outputs from transducers 12b, 12c and 12d result in energization of indicators 15b, 15c and 15d respectively.

The block diagram is of course considerably simplified, and as thus far described simultaneous outputs from all four transducers would result in energization of all four indicators. As a practical matter, however, the most convenient reference to provide is a voltage level, so that for example, the generator 13 impresses on the four stages 14a, to 14d discrete voltage levels with the stage 14a having the smallest voltage and the stage 14d the largest voltage. The transducers 12a to 12d can then readily be made to produce respectively four voltage levels, the highest level being obtained from the transducers 12d. However a difficulty then arises in that the output from the transducer 12d is potentially capable of operating all four stages 14a to 14d, which clearly would be incorrect. For this reason, in the preferred embodiment in which the references are voltage levels, the stages 14a to 14d are coupled so that when a given stage is operated, it prevents operation of all stages which are capable of operating at lower voltages. Thus, if the transducer 12d produces an output, it operates the stage 14d to energize the indicator 15d, but at the same time the stages 14a to 14c are prevented from energizing their indicators 15a to 15c. This in turn means that if two faults occur at once, only the fault which causes the higher voltage to be impressed on the line 16 will be indicated, and for this reason the transducer associated with the most serious fault is arranged to impress the largest voltage on the line 16, and the transducer with the least serious fault impresses the lowest voltage on the line 16.

Figure 2:
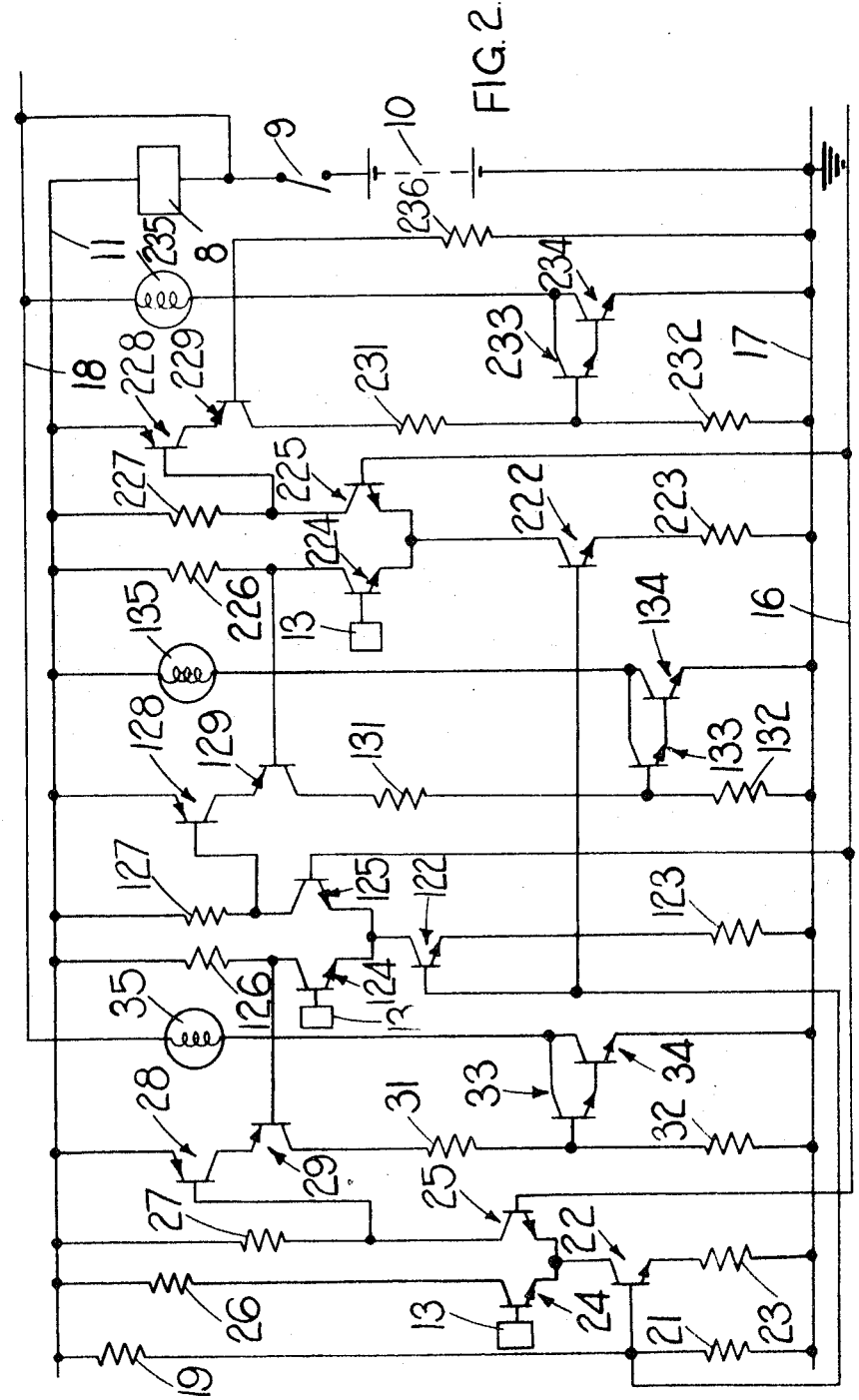
FIGS. 2 and 3 are circuit diagrams illustrating parts of two receiving and display units.
Figure 3:
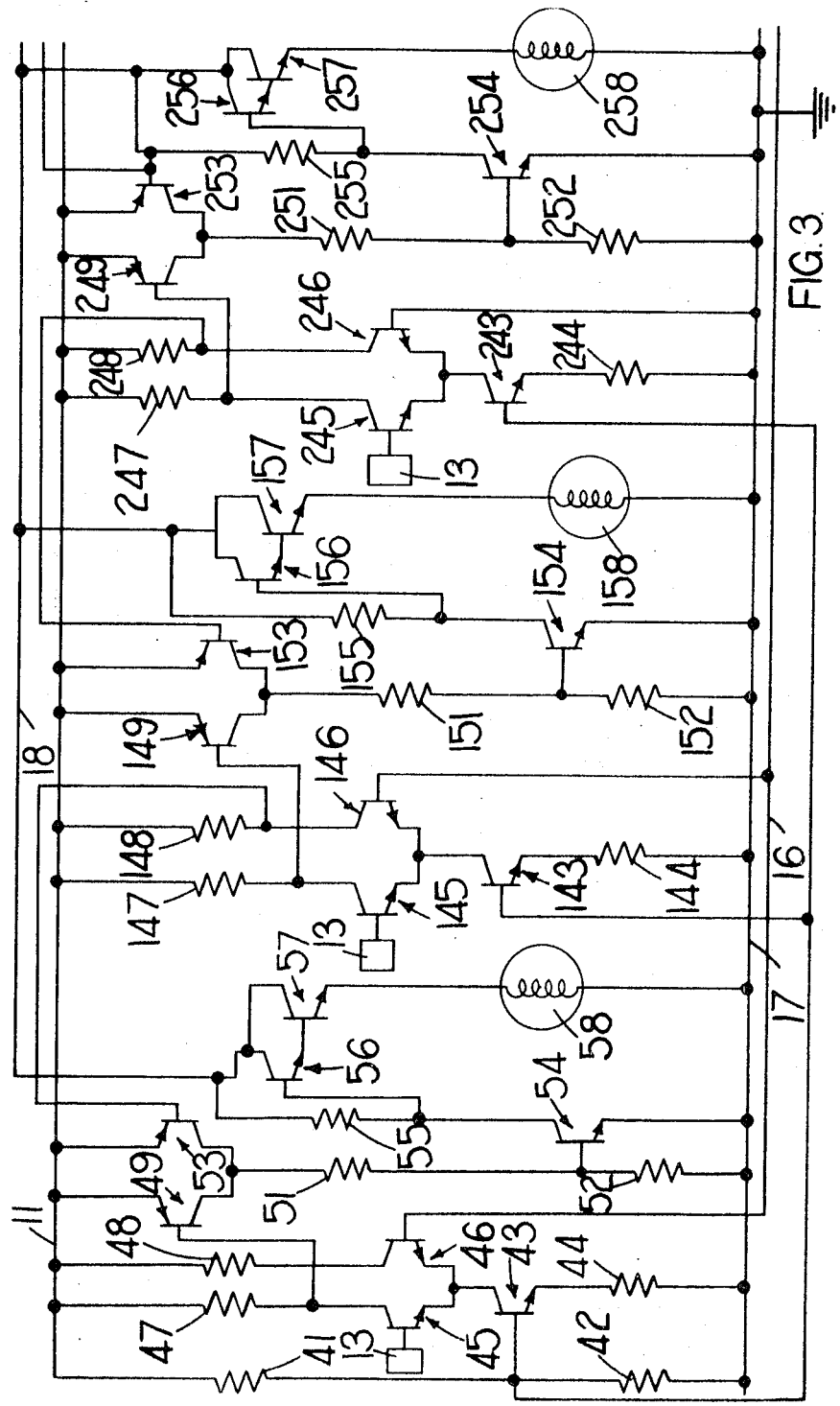

The way in which the inhibition on various stages of the unit 14 operates will be clearer from the more detailed examples of the unit shown in FIGS. 2 and 3.

Referring now to the example shown in FIG. 2, the lines 11 and 16 are the same as those shown in FIG. 1, and in addition there is an earth line 17 and a positive supply line 18 connected to the vehicle battery through the switch 9. Connected in series between the lines 11, 17 are a pair of resistors 19, 21 the junction of which is connected to the base of an n-p-n transistor 22 having its emitter connected to the line 17 through a resistor 23 and its collector connected to the emitters of a pair of n-p-n transistors 24, 25. The collectors of the transistors 24, 25 are connected to the line 11 through resistors 26 and 27 respectively, the base of the transistor 25 is connected to the line 16, and the base of the transistor 24 is connected to the reference generator 13 shown in FIG. 1.

The collector of the transistor 25 is connected to the base of a p-n-p transistor 28, the emitter of which is connected to the line 11, and the collector of which is connected to the emitter of another p-n-p transistor 29, the transistor 29 having its collector connected to the line 17 through resistors 31, 32 in series. The junction of the resistors 31, 32 is connected to the base of an n-p-n transistor 33, the emitter of which is connected to the base of an n-p-n transistor 34 having its emitter connected to the line 17. The collectors of the transistors 33 and 34 are connected through a warning lamp 35 to the line 18.

The components thus far described form one stage of the receiving and display unit, which contains one stage for each fault transducer. Two further stages are shown in FIG. 2, and are indicated with the reference numerals already used increased for the next stage by 100 and for the third stage by 200. It will be noted that the base connection of the transistors 122 and 222 are made to the single resistance chain 19, 21 which can be used for all three stages. It will also be observed that the base of the transistor 29 in the first stage is connected to the collector of the transistor 124 in the second stage, and similarly the base of the transistor 129 in the second stage is connected to the collector of the transistor 224 in the third stage. The transistor corresponding to the transistor 29 in final stage cannot of course be connected to the collector of the transistor corresponding to the transistor 24 in the next stage, but its base is returned to the line 17 through a resistor shown at 236.

For the sake of convenience, it will be assumed that in the arrangement shown in FIG. 2, three transducers are being used which, in the event of their respective faults occurring produce output voltages of 1, 2 and 3 volts on the line 16. The reference voltage applied to the base of the transistor 24 is selected so that the long tailed pair constituted by transistors 24 and 25 will occupy its state with transistor 24 conducting until a one volt signal appears on the base of transistor 25, at which point the long tailed pair will be driven to its alternative state. Likewise, the long tailed pair 124, 125 will switch at 2 volts, and the long tailed pair 224, 225 will switch at 3 volts. When there is no signal on the line 16, the transistor 24 is conducting, the emitter current flowing through the transistor 22. The transistor 25 is off and so no base current is supplied to the transistor 28. Thus, the transistor 28 is off, as are the transistors 33 and 34 which are connected as a Darlington pair. The lamp 35 is off, and similarly the lamps 135 and 235 are off.

Assume that a 1 volt signal appears on the line 16, then neither long tailed pair 124, 125 or 224, 225 is affected. However, the signal turns on the transistor 25, so that base current now flows in transistor 28 which turns on. Current also flows by way of resistor 123, transistor 122 and transistor 124 to the base of transistor 29 to turn transistor 29 on, so that current can flow through transistors 28 and 29 and the resistor 31 to turn on the transistors 33 and 34 and energize the lamp 35.

Assume now that the line 16 receives a 2 volt signal. The lamp 135 will now be energized in the manner just described for the lamp 35. The transistor 25 will turn on as before, and provide base current to the transistor 28. In this case, however, the transistor 29 cannot turn on because the connection of its base to the line 17 is broken by the turning off of transistor 124 in the second stage. Consequently, the lamp 35 is not energized.

If a 3 volt signal appears on the line 17, the lamp 235 will turn on, but although the transistor 125 conducts, transistor 129 cannot turn on because its path to the line 17 is blocked by non-conduction of transistor 224. Similarly, although lamp 135 is not illuminated, the second stage has still operated so that transistor 124 is off, and consequently no base current is supplied to transistor 29, which remains off so that lamp 35 remains off.

It will be appreciated that since there is no need to inhibit the last stage by way of the transistor 229, the transistor 229 of this stage can be omitted altogether, with the collector of the transistor 228 connected directly to the upper end of the resistor 231.

Turning now to the example shown in FIG. 3, the lines 11, 16, 17 and 18 are the same as those shown in FIG. 2. Connected in series between the lines 11, 17 are a pair of resistors 41, 42 the junction of which is connected to the base of an n-p-n transistor 43 having its emitter connected to the line 17 through a resistor 44 and its collector connected to the emitters of a pair of n-p-n transistors 45, 46 the collectors of which are connected to the line 11 through resistors 47, 48 respectively. The base of the transistor 46 is connected to the line 16, and the base of the transistor 45 is connected to the reference generator 13. The collector of the transistor 45 is connected to the base of a p-n-p transistor 49, the emitter of which is connected to the line 11, and the collector of which is connected through a pair of resistors 51, 52 in series to the line 17. The collector of the transistor 49 is further connected to the collector of a p-n-p transistor 53 having its emitter connected to the line 11, and the junction of the resistors 51, 52 is connected to the base of an n-p-n transistor 54 having its emitter connected to the line 17 and its collector connected through a resistor 55 to the line 18. The collector of the transistor 54 is also connected to the base of an n-p-n transistor 56, the emitter of which is connected to the base of an n-p-n transistor 57 having its emitter connected through a warning lamp 58 to the line 17, the collectors of the transistor 56 and 57 being connected to the line 18.

The components thus far described form one stage, and two further stages are shown in the same way as in FIG. 2, with reference numerals being increased by 100 and 200 respectively. Also as in FIG. 2, the transistors 143 and 243 are associated with a common resistance chain 41, 42. The stages are interconnected by coupling the base of the transistor 53 to the collector of the transistor 146. Similarly, of course, the base of the transistor 153 is connected to the collector of the transistor 246 and so on.

When there is no signal on the line 16, the transistor 45 is on and the transistor 46 is off. Current flows through the resistor 44, transistor 43 and transistor 45 to turn on the transistor 49, so that base current is provided to the transistor 54, which holds the transistors 56 and 57 off so that the lamp 58 is not energized. Similarly the lamps 158 and 258 are not energized. If a 1 volt signal appears on the line 16, assuming the same values as in FIG. 2 are being employed, then the transistors 145 and 245 will stay on, but the transistor 46 will turn on and the transistor 45 turn off to remove the base current from transistor 49, so that transistor 54 turns off and current flowing through the resistor 55 turns on the transistors 56 and 57 to energize the warning lamp 58. If a 2 volt signal appears on the line, the lamp 158 is illuminated, but although the transistor 49 turns off, the transistor 53 is turned on as a result of conduction of the transistor 146, and current flows through the transistor 53 to hold on the transistor 54 so that the transistors 56 and 57 stay off. Similarly, if a 3 volt signal appears on the line, the lamp 258 will be illuminated, but transistors 153 and 53 will both be on, thereby ensuring that lamps 58 and 158 are off.

Figure 4:
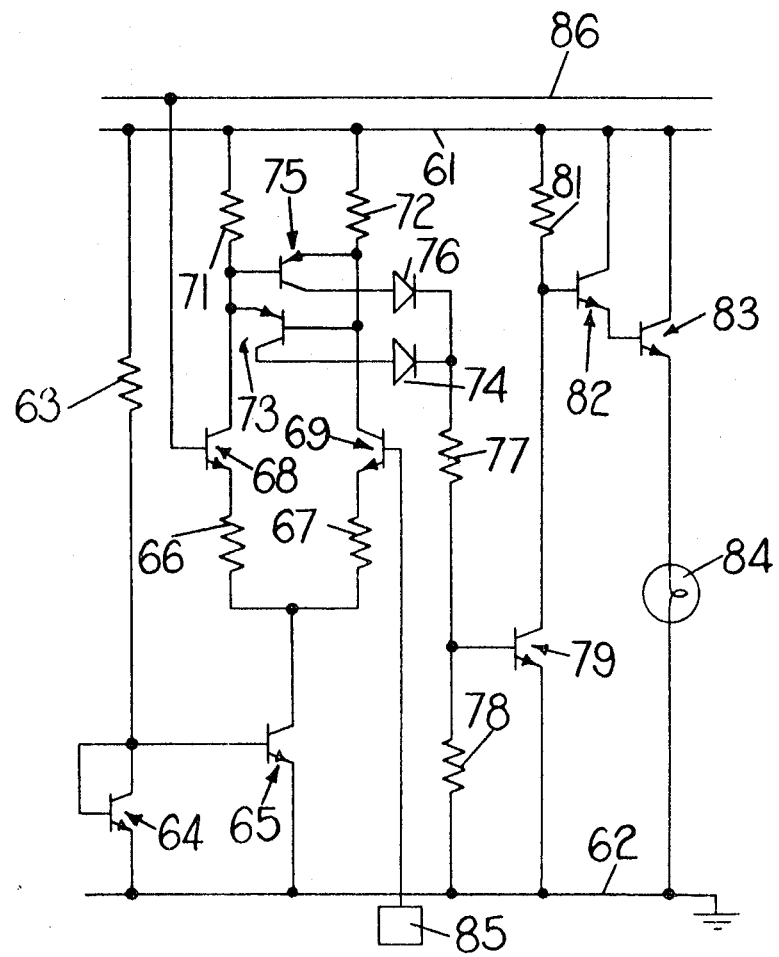
FIG. 4 is a circuit diagram illustrating a further example.

Referring now to FIG. 4, there are provided positive and negative supply lines 61, 62 fed by the vehicle battery. The lines 61 and 62 are interconnected through a resistor 63 and the collector-emitter path of a transistor 64 in series, the transistor 64 having its base and collector interconnected, and its collector further connected to the base of an n-p-n transistor 65. The emitter of the transistor 65 is connected to the line 62, and its collector is connected through resistors 66 and 67 respectively to the emitters of n-p-n transistors 68 and 69, the collectors of which are connected through resistors 71 and 72 respectively to the line 61. The collector of the transistor 68 is further connected to the emitter of a p-n-p transistor 73, the base of which is connected to the collector of the transistor 69 and the collector of which is connected to the anode of a diode 74. The collector of the transistor 69 is connected to the emitter of a p-n-p transistor 75 having its base connected to the collector of the transistor 68 and its collector connected to the anode of a diode 76. The diodes 74 and 76 have their cathodes connected to the line 62 through resistors 77, 78 in series, and the junction of resistors 77 and 78 is connected to the base of an n-p-n transistor 79, the emitter of which is connected to the line 62 and the collector of which is connected through a resistor 81 to the line 61. The collector of the transistor 79 is further connected to the base of an n-p-n transistor 82 having its emitter connected to the base of an n-p-n transistor 83, the emitter of which is connected to the line 62 through a warning lamp 84. The collectors of the transistors 82 and 83 are connected to the line 61.

The circuit illustrated in the drawing is duplicated for each transducer in the system, and the transistor 69 has its base connected to a biasing circuit 85 providing a predetermined bias to the base of the transistor 69, whilst the transistor 68 has its base connected to a lead 86 which is equivalent to the common line 16 in FIGS. 1 to 3.

In operation, assuming that none of the transducers of the system is producing an output, then the transistor 69 conducts but the transistor 68 is non-conductive. Current flowing through the transistor 69 turns on the transistor 73, which provides a signal by way of the diode 74 to turn on the transistor 79, so that the transistors 82 and 83 are off and the lamp 84 is extinguished. Suppose now by way of example that the arrangement shown is set to operate at a voltage level of 5 volts, corresponding to a particular fault. If another fault occurs impressing on the line 86 a voltage of less than 5 volts, then the transistor 68 can conduct but the transistor 69 will conduct more heavily than the transistor 68, so that the diode 74 is still conducting and the lamp 84 is off. If a fault occurs which impresses on the line 86 a larger voltage than the 5 volts for which the arrangement is designed, then the transistor 68 will conduct more than the transistor 69, and in this case the transistor 75 will be conductive, and current flowing through the diode 76 will turn on the transistor 79, keeping the lamp 84 extinguished. Only if the signal on the line 86 is the signal representing the fault for which the circuit shown is designed will the transistors 68 and 69 conduct equally, in which case both transistors 73 and 75 will be off, and there will be no current flow through either diodes 74, 76 so that the transistor 79 is off, and the transistors 82 and 83 conduct to turn on the lamp 84. It will of course be appreciated that with this system a number of similar stages can be employed set to work at different voltages, and there is no need to provide any interconnection between the stages to prevent more than one stage from being operated by a given voltage level.

It will be appreciated that the voltage discriminators described above are stated to operate at a specific voltage, but in practice they will be designed to operate over a small voltage range determined by the components 71, 66 and 72, 67, to allow for tolerances in other component values.

Having thus described my invention what I claim as new and desire to secure by Letters Patent is:

1. A fault detecting system for a road vehicle, comprising a plurality of fault transducers each producing in the event of a fault an output in the form of a voltage level, each of said transducers producing a different voltage level, so that the output produced by each transducer is unique, a receiving and display unit operable by said unique output for indicating each fault, and a single cable connecting all the transducers to the receiving and display unit.

2. A system as claimed in claim 1 in which the receiving and display unit includes a plurality of voltage-sensitive switching circuits, each of which is sensitive to a small voltage range so that only one of the switching circuits is operated by a given voltage on said single cable.

3. A system as claimed in claim 1 in which the receiving and display unit includes a plurality of switching circuits each of which requires a minimum voltage to cause it to operate, so that a given voltage level corresponding to a given fault operates its own switching circuit, but is also capable of operating the switching circuits which can be operated by lower voltage levels, the switching circuits being interconnected so that for a given voltage level, operation of the switching circuit which can be operated by lower voltage levels is prevented.

* * * * *